R. A. BAYLES.
DITCH DIGGER.
APPLICATION FILED APR. 24, 1919.
1,346,075.
Patented July 6, 1920.
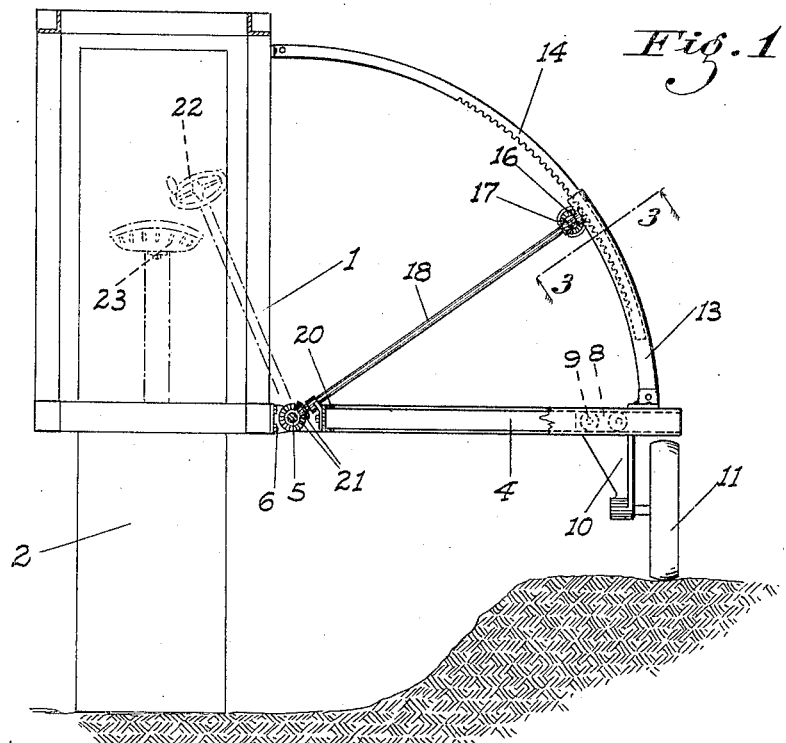
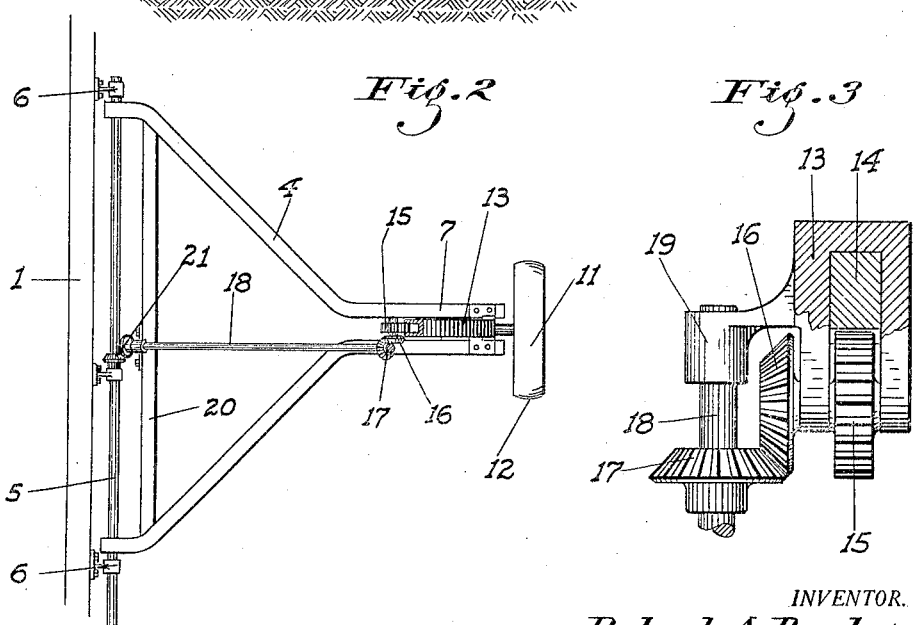
INVENTOR.
Robert A. Bayles
BY
ATTORNEY

UNITED STATES PATENT OFFICE.

ROBERT A. BAYLES, OF STOCKTON, CALIFORNIA.

DITCH-DIGGER.

1,346,075. Specification of Letters Patent. Patented July 6, 1920.

Application filed April 24, 1919. Serial No. 292,260.

*To all whom it may concern:*

Be it known that I, ROBERT A. BAYLES, a citizen of the United States, residing at Stockton, in the county of San Joaquin, State of California, have invented certain new and useful Improvements in Ditch-Diggers; and I do declare the following to be a full, clear, and exact description of the same, reference being had to the accompanying drawings, and to the characters of reference marked thereon, which form a part of this application.

This invention relates to improvements in ditch diggers and particularly to that type shown in my copending application for patent filed March 25th, 1919, Serial Number 285,040.

The present invention relates to improvements in the supporting wheel mechanism, the principal object being to provide a supporting wheel for the main digging wheel which may be adjusted for vertical movement, this adjustment being made by the operator from his seat on the digger.

This feature is important as it not only regulates the depth at which the digger wheel operates, but can be operated instantly to maintain the vertical alinement of the digger wheel when the supporting wheel encounters a raise or depression in the ground while the machine is in operation.

Another object is to produce a simple and inexpensive device and yet one which will be exceedingly effective for the purposes for which it is designed.

These objects I accomplish by means of such structure and relative arrangement of parts as will fully appear by a perusal of the following specification and claims.

On the drawings, similar characters of reference indicate corresponding parts in the several views.

Figure 1 is an end elevation of my adjustable supporting wheel mechanism, showing the same attached to the frame of a ditch digger adjacent the digger wheel thereof.

Fig. 2 is a top plan view of the mechanism shown in Fig. 1.

Fig. 3 is an enlarged cross section taken on a line 3—3 of Fig. 1, showing the rack operating gears.

Referring now more particularly to the characters of reference on the drawings, the numeral 1 denotes the main frame of the ditch digger, on which is mounted a digger wheel 2 of the type shown and described in my aforementioned application for patent. A substantially V-shaped frame 4 is pivotally mounted to the frame 1 longitudinally thereof on a shaft 5 mounted in brackets 6 attached to the frame. The apex of this frame extends therebeyond at a right angle to the frame 1 for a certain distance as at 7, the frame being preferably a pair of channels facing inwardly and spaced apart somewhat at such portion 7 for the reception of a truck 8 mounted on rollers 9 movable in the channels. Depending between the channel members and attached to the truck 8 is a bracket 10 on which is mounted a supporting wheel 11 the same preferably having a convex rim as at 12. By means of this truck the wheel 11 may be adjusted for horizontal position relative to the frame 1.

Mounted to the frame 4 at the outer end of the portion 7 thereof is a rectangular tubular brace member 13, in which is adapted to slide a rectangular brace 14 mounted to the frame 1. Both members 13 and 14 are curved concentric with the shaft 5. The inner face of the brace 14 is provided with teeth adapted to mesh with a pinion 15 mounted to the member 13 and projecting therein. Turnable with the pinion and secured thereto is a bevel gear meshing with a similar gear 17 on a shaft 18 journaled at one end to the member 13 as at 19 and at the other end on a connecting beam 20 on the frame 4. Miter gears 21 on the shafts 18 and 5 respectively mesh together.

The shaft 5 is turnably connected in any suitable manner to a hand wheel 22 adjacent the driver's seat 23 on the ditch digger frame 1. I preferably use a worm drive in this connection, as such a drive eliminates any tendency of the various gears to turn unless the worm is intentionally operated.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what

I claim as new and useful and desire to secure by Letters Patent is:—

1. In combination with a ditch digger having a digger wheel, a horizontal frame pivotally mounted on a shaft to one side of the wheel at right angles thereto, a supporting wheel mounted to the frame at the outer end thereof, braces adapted to telescope mounted to the supporting wheel frame and to the frame of the ditch digger and means operable from the driver's seat of the digger whereby the relative telescopic position of the braces may be adjusted at will, the braces being concentric with the pivotal shaft of the supporting wheel frame.

2. In combination with a ditch digger having a digger wheel, a horizontal frame pivotally mounted on a shaft to one side of the wheel at right angles thereto, a supporting wheel mounted to the frame at the outer end thereof, braces adapted to slide one within the other mounted to the supporting wheel frame and to the frame of the ditch digger, the braces being concentric with the pivotal point of the supporting wheel frame, teeth on the inner face of the inner brace adapted to mesh with a pinion mounted to the outer brace and projecting therein and means operable by the turning of the pivotal shaft to turn the pinion and alter the respective position of the braces.

3. In combination with a ditch digger having a digger wheel, a horizontal frame pivotally mounted on a shaft to one side of the wheel at right angles thereto, a supporting wheel mounted to the frame at the outer end thereof, braces adapted to slide one within the other mounted to the supporting wheel frame and to the frame of the ditch digger, the braces being concentric with the pivotal point of the supporting wheel frame, teeth on the inner face of the inner brace adapted to mesh with a pinion mounted to the outer brace and projecting therein and means operable by the turning of the pivotal shaft to turn the pinion and alter the respective position of the braces, such means including a shaft mounted to the supporting wheel frame and to the outer brace, and bevel gears thereon meshing with similar gears secured to the pinion and to the pivotal shaft of the frame.

In testimony whereof I affix my signature.

ROBERT A. BAYLES.